United States Patent
Caballero Jambrina et al.

(10) Patent No.: US 12,143,158 B1
(45) Date of Patent: *Nov. 12, 2024

(54) IMPAIRMENT GENERATION

(71) Applicant: Acacia Communications, Inc., Maynard, MA (US)

(72) Inventors: Antonio Caballero Jambrina, Burlington, MA (US); Miquel Mestre Adrover, Cambridge, MA (US); Pierre Humblet, Cambridge, MA (US)

(73) Assignee: ACACIA COMMUNICATIONS, INC., Maynard, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/205,252

(22) Filed: Jun. 2, 2023

Related U.S. Application Data

(63) Continuation of application No. 17/355,010, filed on Jun. 22, 2021, now Pat. No. 11,695,485, which is a continuation of application No. 16/826,955, filed on Mar. 23, 2020, now Pat. No. 10,880,019, which is a continuation of application No. 16/285,654, filed on Feb. 26, 2019, now abandoned.

(60) Provisional application No. 62/782,793, filed on Dec. 20, 2018.

(51) Int. Cl.
*H04B 17/00* (2015.01)
*H04B 17/16* (2015.01)
*H04B 17/373* (2015.01)
*H04B 17/391* (2015.01)

(52) U.S. Cl.
CPC ..... *H04B 17/0085* (2013.01); *H04B 17/0087* (2013.01); *H04B 17/16* (2015.01); *H04B 17/373* (2015.01); *H04B 17/3912* (2015.01)

(58) Field of Classification Search
CPC .................. H04B 17/0087; H04B 17/0085
See application file for complete search history.

(56) References Cited

U.S. PATENT DOCUMENTS

| | | | |
|---|---|---|---|
| 6,424,445 B1 | 7/2002 | Tsushima et al. | |
| 7,181,360 B1 | 2/2007 | Nikolac et al. | |
| 9,470,361 B1 | 10/2016 | Arias | |
| 10,069,590 B1 | 9/2018 | Wang et al. | |
| 10,374,702 B1 * | 8/2019 | Yue | H04Q 11/00 |
| 10,880,019 B1 | 12/2020 | Adrover et al. | |
| 11,695,485 B1 | 7/2023 | Jambrina et al. | |
| 2003/0202571 A1 | 10/2003 | Kearney et al. | |
| 2005/0129344 A1 | 6/2005 | Ishizuka | |
| 2006/0067688 A1 | 3/2006 | Inman et al. | |
| 2006/0122814 A1 | 6/2006 | Beens et al. | |
| 2011/0255865 A1 | 10/2011 | Brooks et al. | |
| 2013/0148503 A1 | 6/2013 | Hutchison et al. | |
| 2016/0238795 A1 | 8/2016 | Tan et al. | |
| 2017/0013486 A1 | 1/2017 | Beyme | |
| 2017/0244489 A1 | 8/2017 | Zhuge et al. | |
| 2018/0003899 A1 | 1/2018 | Doerr et al. | |

* cited by examiner

*Primary Examiner* — Kevin Kim
(74) *Attorney, Agent, or Firm* — K&L GATES LLP

(57) ABSTRACT

A method, system, and apparatus for emulating impairments in a communication system.

20 Claims, 9 Drawing Sheets

IMPAIRMENT GENERATION

CROSS-REFERENCE TO RELATED APPLICATIONS

This application is a continuation application claiming priority under 35 U.S.C. § 120 of U.S. patent application Ser. No. 17/355,010 filed Jun. 22, 2021, titled "Impairment Generation," now U.S. Pat. No. 11,695,485, issued Jul. 4, 2023, which is a continuation of U.S. patent application Ser. No. 16/826,955 filed Mar. 23, 2020, now U.S. Pat. No. 10,880,019 issued Dec. 29, 2020, titled "Impairment Generation," which is a continuation of U.S. patent application Ser. No. 16/285,654 filed Feb. 26, 2019, titled "Impairment Generation," which claims the benefit of U.S. provisional patent application 62/782,793 filed Dec. 20, 2018, titled "Impairment Generation," all of which are incorporated herein by reference in their entirety for all purposes.

BACKGROUND

A communication system may suffer from the effects of impairments. An impairment may be something that interferes with the ability of the communication system to communicate data.

BRIEF DESCRIPTION OF THE FIGURES

Various aspects and embodiments of the application will be described with reference to the following example embodiments. It should be appreciated that the figures are not necessarily drawn to scale.

SUMMARY

Figure 1:
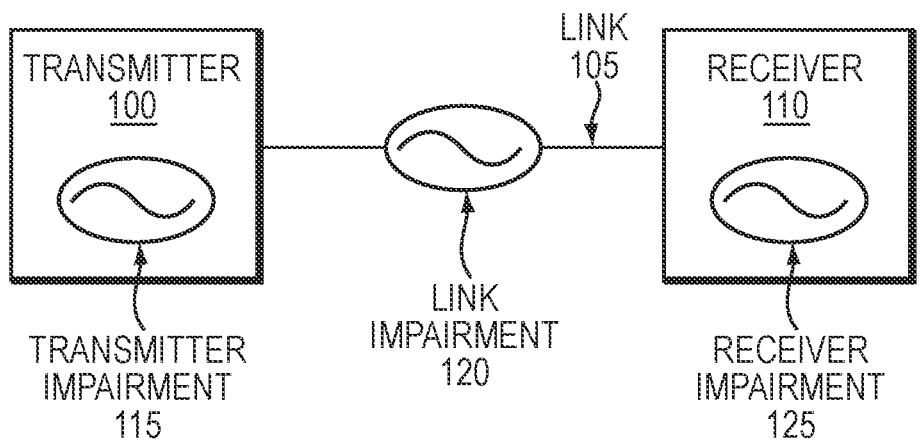
FIG. 1 is a simplified illustration of an optical communication system with impairments, in accordance with an embodiment of the present disclosure.

A method, system, and apparatus for emulating impairments in a communication system.

DETAILED DESCRIPTION

Typically, there may be different types of impairments in a communication system. Generally, impairments may be present in both optical and electrical systems. Usually, impairments may interfere with the ability to communicate data in a communication system. Conventionally, in an optical system, amplified spontaneous emission (ASE) or optical noise may be present.

Typically, ASE, which introduces optical noise to change the optical to signal noise ratio (OSNR) is introduced in a system through optical amplifiers. Usually, in an optical system that travels long distances, amplifiers may be added to increase signal strength that may have degraded due to some of the signal being absorbed by the optical system. Generally, each amplifier adds ASE to the system which is optical random noise. Typically, the amount of ASE or optical noise added depends on the number of amplifiers, and the number of amplifiers may be dependent on the length of an optical fiber in an optical communication system.

Conventionally, another type of impairment in an optical system may be dispersion. Dispersion may refer to delay in an optical system resulting from different wavelengths of light. Generally, light of different wavelengths or frequency propagates through an optical fiber different at slightly different speeds depending on frequency or wavelength. Typically, if multiple light waves are sent over a channel or optical fiber, the light received at the end of the fiber or channel will arrive at different times then it was transmitted at a transmitter. For example, blue light generally travels more solely than red light in certain transparent mediums. Typically, over time transmitted signals will spread further apart. Generally, an optical system may "pre-compensate" for such dispersion by buffering data at a transmitter to pre-compensate for dispersion over the channel. An alternative conventional solution is to add post compensation to a system accommodate for dispersion. Generally, the amount of dispersion may be calculated by knowing the length of the channel or optical fiber.

Usually, PDL—polarization dependent loss—or a change in power between different polarization of the light can also impair an optical signal. Generally, in an optical system, two polarization light may be sent in an optical system with data in each polarization of light. Typically, one polarization of light becomes attenuated in respect to another polarization of light. PDL can be introduced in any portion of an optical transmission system such as in a transmitter, receiver, or transmission link.

Conventionally, skew may be delay between I and Q components of a signal. In optical systems, data may be transmitted on I and Q signal components. Skew may be delay between the I and Q components when the I and Q are generated and sent by a transmitter and when they are received and decoded by a receiver. Usually, I/Q skew may occur because the I and Q components may suffer from different delays either at the transmitter, at the receiver or at both sides. Generally, skew may be removed through calibration. In some embodiments skew may change during use of an optical system because of changes such as temperature changes.

Typically, another type of impairment may relate to I/Q balance. Generally I/Q imbalance may refer to difference in amplitude between the in-phase and quadrature components of a signal. Conventionally I/Q imbalance may be introduced by a transmitter, receiver or both sides. Usually, a modulator at a transmitter may have different gain or loss for different arms of a modulator creating an I/Q imbalance. Generally, the amount of I/Q imbalance may change with temperature and may not be constant.

Other types of impairments may include receiver skew and receiver I/Q imbalance. A still further type of impairment may be differential group delay (DGD), which represents skew between the polarizations of light. Another type of impairment may refer to $2^{nd}$ order polarization mode dispersion (PMD). Conventionally, communication systems have implemented different schemes to minimize or remove different types of impairments.

In most embodiments, the current disclosure has realized that to test the effectiveness of a system to respond to or eliminate impairments required expensive testing equipment. In certain embodiments, the current disclosure has realized that to test an optical communication system might include creating a test system with hundreds or thousands of feet of optical cable. In other embodiments, the current disclosure has realized that it may be costly to buy specific equipment to emulate different types of interference in an optical system or set up a large optical test system.

For example, typically, optical noise may have been generated in added amplifiers in a testing system or having a piece of equipment for ASE source generator in the optical link that give optical noise. In some embodiments, the current disclosure may enable adding simulated or emulated optical noise or ASE to an optical communication system without using amplifiers or external equipment. In many embodiments, a DSP may add ASE.

Conventionally, to add DGD, a DGD emulator, which is an optical device that splits both X and Y polarization, delays one polarization with respect to the other, and recombines them, would need to be added to an optical system. Generally, to simulate PMD, PDL or dispersion, individual PMD, PDL or dispersion emulators would need to be added to a system. Alternative conventional ways of creating dispersion may be to create a link in a testing environment spanning hundreds or thousands of feet.

In most embodiments, the current disclosure has realized that equipment to emulate impairments may occur in an optical portion of an optical system as opposed to an electrical portion of an optical system. In almost all embodiments, the current disclosure has realized that it may be advantageous to emulate impairments without specialized equipment.

In certain embodiments, the current disclosure has recognized that there may be advantages to emulating impairments through the use of a digital signal processor (DSP) on a transceiver. In other embodiments, the current disclosure has realized it may be advantageous for a DSP to insert known amounts of impairments into a digital signal that will be converted to a light signal with the digital date. In some embodiments, a DSP may insert impairments in coordination with other elements of a communication system to extend the amount of impairment emulation beyond what could be emulated by a DSP in isolation. In further embodiments, the current disclosure has realized that it may be advantageous to have control circuitry to purposely change calibration settings of a transmitter or transceiver to input known impairments into a communication system. In almost all embodiments, modifying a transmission system of a communication system to inject impairments into a communication system may enable testing of the ability of the communication system to handle the impairments. In other embodiments, a receiver portion of a transmission system may be modified to input impairments into an optical system.

In a particular embodiment, dispersion may be added in a line by delaying transmission of certain frequencies relative to other frequencies of light. In further embodiments, noise may be introduced into a system through the use of a noise generator in a DSP. In certain embodiments, a random number generator may be used to simulate addition of noise into a system. In some embodiments, random numbers may be used to change values sent to an analog to digital converter (ADC) from a photodetector on a receiver. In other embodiments, random numbers may be used to change digital samples before they are sent from to a digital to analog converter (DAC).

In some embodiments, a decision may be made what types of impairments are desired to be present in simulation and a computer may generate a signal with the impairments, where the generated signal is fed into and stored in memory of a transmitter before the signal is sent to DAC, which electrically generates the signal of a communications system. In many embodiments, Dispersion, PDL, DGD, TX IQ skew, TX IQ imbalance, PMD, frequency offset, polarization scrambling may be generated and added to a signal and stored in memory of a communication system to be communicated from a transmitter to a receiver. In further embodiments, changes to I Q balance may be made by changing the values of a modulator to inject known amounts of imbalance. In still further embodiments, changes to a modulator via a DSP or control signals may be used to inject specific amounts of PDL and/or IQ imbalance.

In almost all embodiments, with the ability to inject known impairments, an optical system may be tested to evaluate how many impairments can be handled by the system and under what conditions. In further embodiments, with the ability to inject known impairments, and optical system may be tested to evaluate the tolerances of the optical system. In many embodiments, with the ability to create impairments in an optical transceiver card, the need for expensive optical equipment or an optical test system with large amounts of optical fiber may be eliminated.

In some embodiments, the current disclosure may enable adding simulated or emulated optical noise or ASE to an optical communication system without using amplifiers or external equipment. In many embodiments, a DSP may add ASE.

In certain embodiments, at each clock cycle or time increment of a DSP, a number N of samples or digital values represented by b bit wide signed numbers may enter a simulator or emulator. In some embodiments, noise samples with a specified distribution may be added to input samples at each clock cycle and output. In many embodiments, at each clock cycle, a linear feedback shift register (LFSR) machine may generate N (B+1) bits, organized as N groups of B+1 bits. In many embodiments, a size of a LFSR register, may determine a repetition period of the LFSR machine. In almost all embodiments, a repetition period may need to be large enough to support the application. In a particular embodiment, a register of 55 bits with a polynomial x^55+x^24+1 may be appropriate.

In certain embodiments, successive bits generated by a LFSR may be correlated. To decorrelate the bits each group of B+1 bits may be xored with a B+1 bit mask. In most embodiments, a mask may be different for each of N groups. For example, in a particular embodiment for N=128 and B=7, masks may be codewords of an extended BCH error correcting code (eBCH) of length 16 with 7 information bits. In this particular embodiment, a fixed additional pattern of B+1 bit may be xored with the eBCH word, to avoid having an all-0 mask.

In some embodiments, for a group N, one of B+1 bits may be used to determine a sign of a random number that will be generated. In certain embodiments, some of the B bits may be interpreted as an unsigned binary number m and compared L−1 configurable thresholds $t_1, t_2, \ldots t_{L-1}$, where each threshold may be a B bit wide and listed in non-decreasing order; wherein the thresholds are an array of values.

In certain embodiments, for a set of thresholds $t_1, t_2, \ldots t_{L-1}$, logic may find the largest k such that m>tk; wherein tk is the $k^{th}$ element of the thresholds. In many embodiments, if there is not a value of k such that m>tk where tk is the $k^{th}$ element of the thresholds, then, k may be set to 0. In most embodiments, a sign of k is changed if the bit reserved for that purpose is 1. In many embodiments, k may take integer values between −L+1 and L−1, and the probability of these values may be determined by values of a set of thresholds. In most embodiments, threshold values may be set to approximate well-known distributions that are symmetrical around 0.

In some embodiments, if a range of k is smaller than a range of the input signals, between $-2^b$ and $2^{b-1}-1$, a full range may not be covered. In these some embodiments, to cover the full range, k may be multiplied by a configurable scale, which may be common to all N groups. In these some embodiments, a result of the multiplication may be added to a nth input signal and a configurable bias common to the N groups may be added to the result if desired. In some embodiments, output may be saturated if it is outside of the signal range desired at the output.

In other embodiments, in optical applications an optical signal may have in-phase and quadrature components on both the horizontal and vertical polarizations, so typically input data may have of 4 streams. In many embodiments, multiple streams may be muxed together and handled jointly. In other embodiments with multiple data streams, an algorithm for noise addition may be executed in parallel, one for each stream. In embodiments where there are algorithms executing in parallel, it may be necessary to set initial seeds of the LFSR appropriately, to ensure that the noise patterns are shifted sufficiently with respect to each other in different streams (the shift can be made equal to about ¼ of the LFSR repetition period.

Refer now to the example embodiment of FIG. 1, which illustrates examples of impairments in a transmission system. In the example embodiment of FIG. 1, Transmitter 100 transmits data over link 105 to receiver 110. Transmitter 100 has transmitter impairment 115. Link 105 has impairment 120. Receiver 110 has receiver impairment 125. In the example embodiment of FIG. 1, each type of impairment, such as transmitter impairment 115, link impairment 120, and receiver impairment 125 may impair a transmission and each impairment may be cumulative or multiplicative. In almost all embodiments, impairments do not cancel each other out.

In some embodiments, there may be many different types of impairments introduced at a transmitter. In most embodiments, there may be many different types of impairments introduced in a link. In almost all embodiments, there may be different impairments introduced at a receiver.

Figure 2:
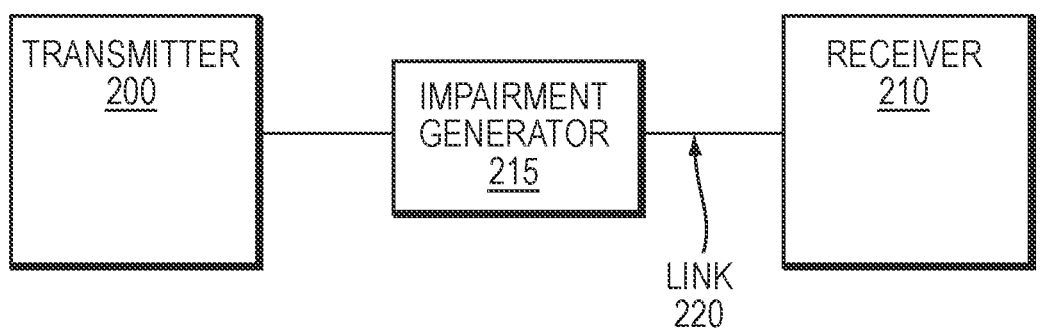
FIG. 2 is a simplified illustration of an optical communication test system with an external impairment generator, in accordance with an embodiment of the present disclosure.

Refer now to the example embodiment of FIG. 2, which illustrates an impairment generator included in a transmission link between a transmitter and a receiver. In the example embodiment of FIG. 2, Transmitter 200 is connected through impairment generator 215 in link 220 to receiver 220. In this example embodiment, impairment generator 215 may input many different types of impairments to a signal transmitted between transmitter 200 and receiver 210.

In certain embodiments, an impairment generator, such as impairment generator 215 of FIG. 2, may be for an optical system and a link, such as for example link 220 of FIG. 2, may be an optical link. In some embodiments, an optical impairment generator may input a specific type of impairments. In a particular embodiment, an optical impairment generator may input ASE or optical noise, such as may be generated in an optical system with one or more amplifiers between a transmitter and a receiver. In other embodiments, an optical impairment generator may input dispersion, skew, or polarization skew. In almost all embodiments, the current disclosure realizes that there may need to be an optical impairment generator for each type of impairment desired to be tested. In many embodiments, an optical impairment generator may be an expensive and complicated type of equipment.

Figure 3:
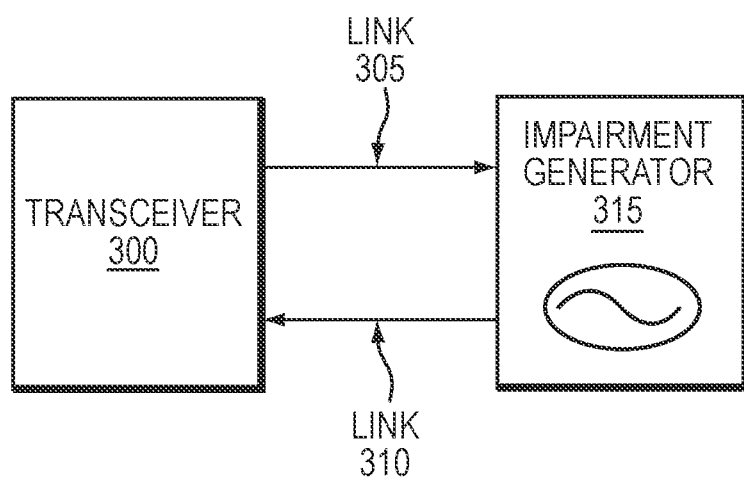
FIG. 3 is an alternative simplified illustration of an optical communication test system with an external impairment generator, in accordance with an embodiment of the present disclosure.

Refer now to the example embodiment of FIG. 3, which illustrates an alternative embodiment of FIG. 3, where an impairment generator is connected to a transceiver. In the example embodiment of FIG. 3, an output port of a transceiver, which is a combination of a transmitter and a receiver, is connected to an input port of the same transceiver by link 305 connecting to impairment generator 315, connecting to link 310 back to the input port of the transceiver 300. This embodiment of FIG. 3 uses impairment generator 315 to generate impairments but does not require a separate receiver.

Figure 4:
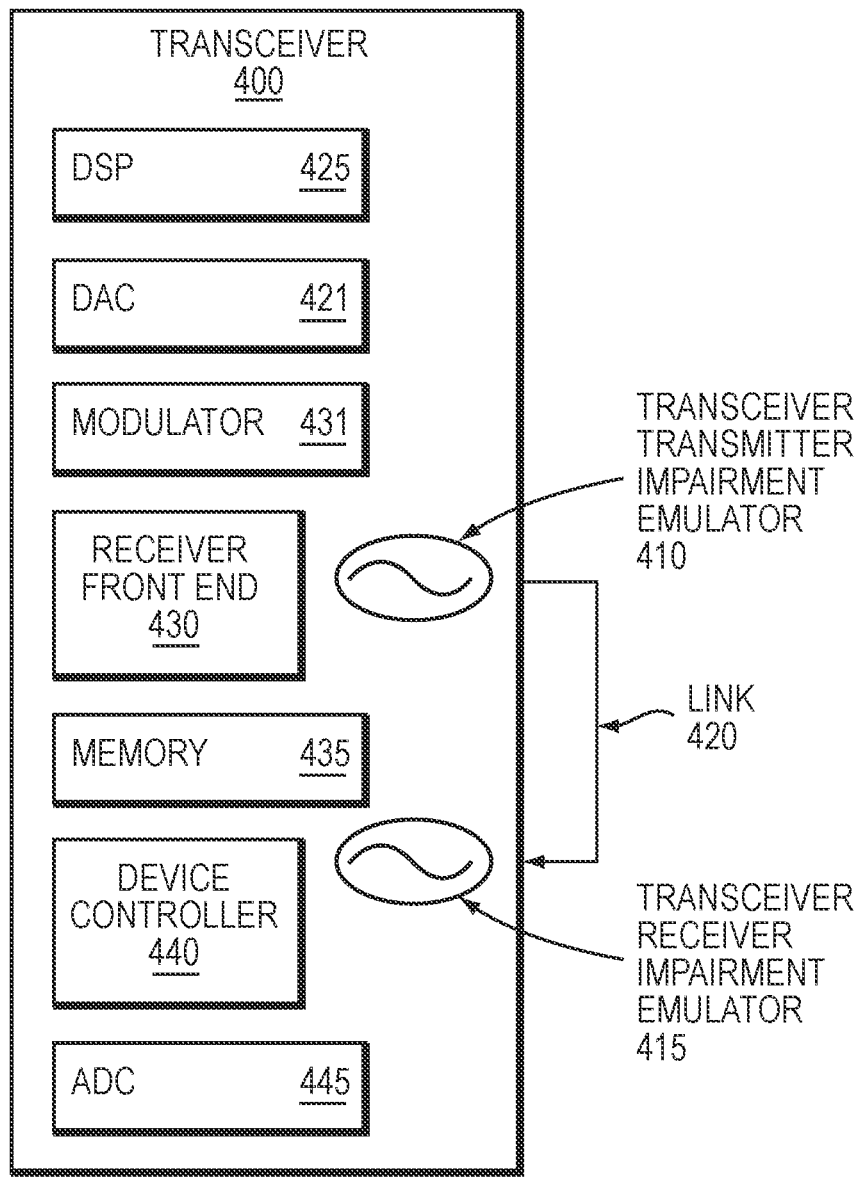
FIG. 4 is a simplified illustration of an optical transceiver with a built in impairment generator, in accordance with an embodiment of the present disclosure.

Refer now to the example embodiment of FIG. 4, which illustrates an output port of a transceiver connected to the input port of the transceiver. In the example embodiment of FIG. 4, there is not an impairment generator. Rather in FIG. 4, transceiver 400 is enabled to generate impairments, before an electrical signal is changed to an optical signal, during generation of the optical signal, during receiving of the optical signal, during changing of the optical signal into an electrical signal, and/or after the optical signal has been changed into a digital signal. In FIG. 4, transceiver 400 has DAC 425, Modulator 430, memory 435, device controller 440, and ADC 445. In certain embodiments, a transceiver may have a DSP for a transmitter and a DSP for a receiver in a transceiver. In some embodiments, a transceiver may have one or more Modulators for a transmitter and a one or more Modulators for a receiver in a transceiver. In many embodiments, a transceiver may have one or more ADCs for a transmitter and a one or more ADCs for a receiver in a transceiver. In many embodiments, a transceiver may have one or more DACs for a transmitter and a one or more DACs for a receiver in a transceiver.

In some embodiments, a DSP, such as DSP 425 of FIG. 4, may be used to generate one or more impairments, either before the signal is sent or after the signal is sent. In other embodiments, a signal may be read in from memory, such as memory 430 of FIG. 4, where the signal has been generated to contain one or more impairments. In certain embodiments, a modulator, such as modulator 435 of FIG. 4, may be used to create impairments in an optical system. In further embodiments, device controllers, such as device controller 440 of FIG. 4, may be used to create impairments in an optical system.

Figure 5B:
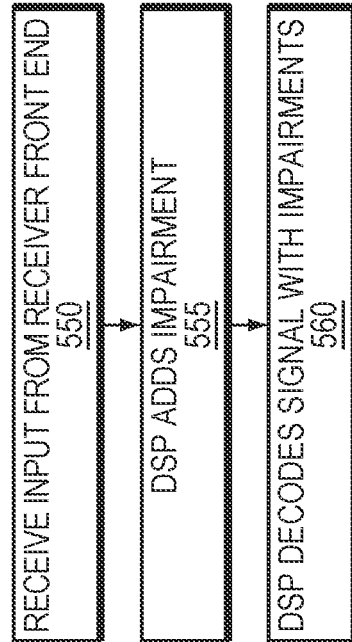
FIG. 5b is a simplified method for generating an impairment at a transmitter modulator, in accordance with an embodiment of the present disclosure.
Figure 5D:
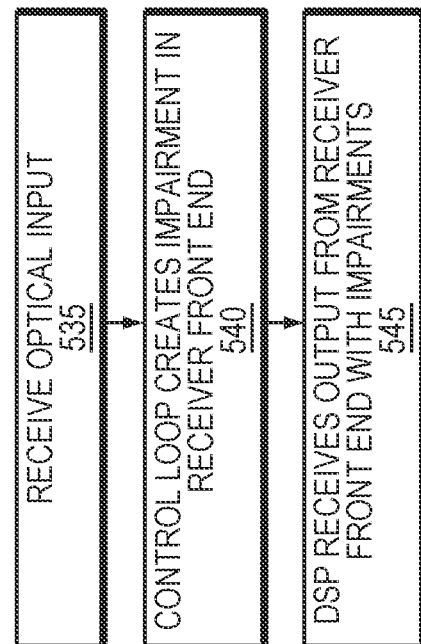
FIG. 5d is a simplified method for generating an impairment at a modulator in a receiver, in accordance with an embodiment of the present disclosure.
Figure 5A:
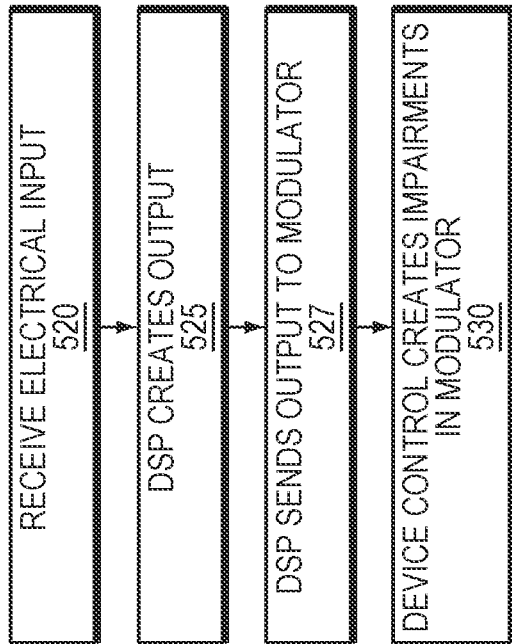
FIG. 5a is a simplified method for generating an impairment at a transmitter DSP, in accordance with an embodiment of the present disclosure.

Refer now to the example embodiment of FIGS. 4 and 5a, which illustrates a sample method for inputting impairments into a transmission system. DSP 425 receives electrical inputs corresponding to digital data (step 505). DSP creates output with impairments (step 510). DSP 425 sends the output with impartments to modulator 431 (step 515). In some embodiments, DSP 425 may indirectly send output to modulator 431 through one or more intermediary devices such as digital to analog converters.

Refer now to the example embodiment of FIGS. 4 and 5b, which illustrates a sample method for inputting impairments into a transmission system. DSP 425 receives electrical inputs corresponding to digital data (step 520). DSP 425 creates output (step 525). DSP 425 sends the output to modulator 430 (step 527). Modulator 435 creates impairments while modulating the data (step 530). In some embodiments, modulator 431 may input impairments through by being controlled by device controller 440.

Figure 5C:
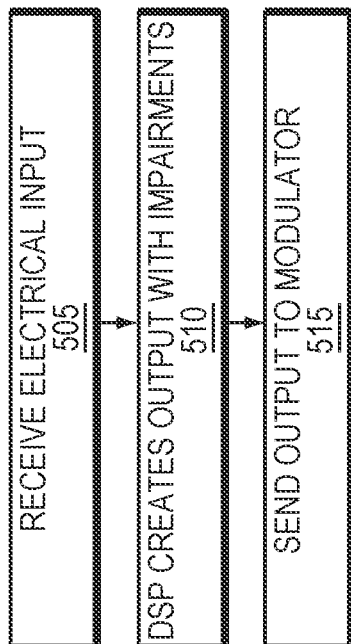
FIG. 5c is a simplified method for generating an impairment at a receiver, in accordance with an embodiment of the present disclosure.

Refer now to the example embodiment of FIGS. 4 and 5c, which illustrates a sample method for inputting impairments into a transmission system. Receiver Font End 430 receives optical inputs corresponding to digital data (step 535). Receiver Font End 430 creates output with impairments (step 540). Modulator 430 sends the output with impartments to DSP 425 (step 545). In some embodiments, Modulator 430 may indirectly send output to DSP 425 through one or more intermediary devices such as analog to digital converters. In many embodiments, a receiver front end may include an optical hybrid, photodiodes and TIAs.

Refer now to the example embodiment of FIGS. 4 and 5d, which illustrates a sample method for inputting impairments into a transmission system. DSP 425 receives electrical inputs corresponding to digital data from receiver front end 530 (step 550). DSP creates output with impairments (step 555). DSP 425 decodes signal with impairments (step 560). In some embodiments, DSP 425 may indirectly receive input from receiver front end 430 through one or more intermediary devices.

Figure 6:
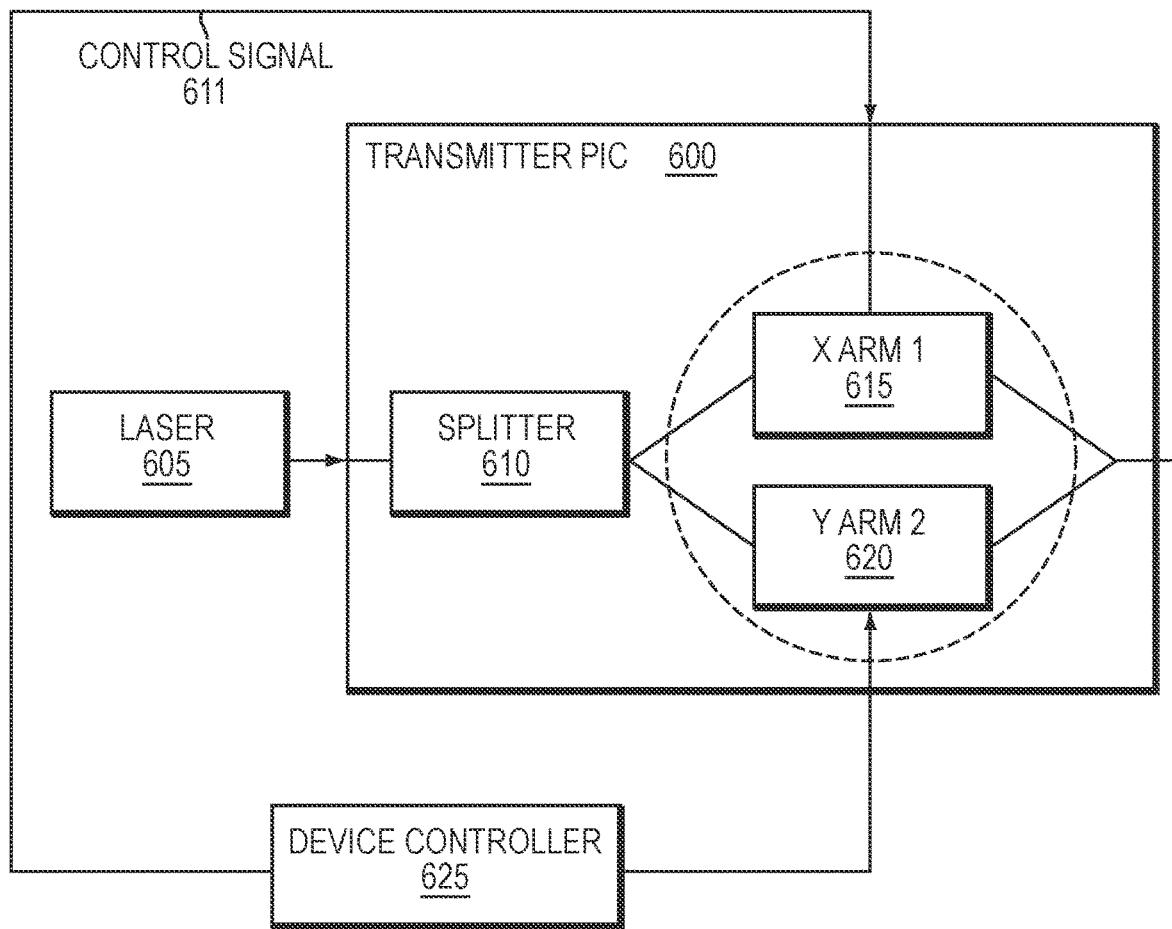
FIG. 6 is a simplified illustration for generating an impairment at a modulator, in accordance with an embodiment of the present disclosure.

Refer now to the example embodiment of FIG. 6, which illustrates an optical modulator. In this example embodiment, laser 605 feeds splitter 610, which splits light from laser 605 to two arms of the modulator, corresponding to the X and Y polarizations, X arm 1 615 and Y arm 2 620 on transmitter PIC 600. The voltage to X arm 1 615 is controlled by signal of electric amplifier 622 and the signal to Y arm 2 620 is controlled by voltage of electric amplifier 624. The ratio of signal 622 of electric amplifier to signal of electric amplifier 624 enables you to insert PDL into system. If the ratio of signal 622 of electric amplifier to signal 624 of electric amplifier is close to 1, then there may be little or no PDL. If the ratio of voltage 622 of electric amplifier to signal of electric amplifier 624 is changed, then PDL is inserted into the system. The ratio of signal 622 of electric amplifier to signal of electric amplifier 624 is controlled by device controller 625. In other embodiments, a ration of an X and Y arm of a modulator may be controlled by current.

In some embodiments the signals amplitude of signals, such as signal 622 and 624, (and the ratio between signals) may be changed by modifying an output and/or gain of electrical amplifiers, such as electric amplifiers 622 and 624 of FIG. 6, which typically feed X and Y arms, and/or by modifying an output of DACs, typically feeding the electrical amplifiers. In another embodiment, PDL may be also introduced by changing an intensity ratio between optical signals travelling through X and Y arms, respectively, of an optical modulator.

In the example embodiment of FIG. 6, PDL may be introduced by changing a splitting ratio of a splitter 610, such as splitter 610 of FIG. 6. In certain embodiments, a splitter may be a variable splitter with a splitting ratio between two outputs. In most embodiments a variable splitter may feeding modulator arms, such as modulator arms 615 and 620 of FIG. 6, and a ratio of the variable splitter may be changed by a control signal, such as control signal 611, of a device controller, such as device controller 625. In other embodiments, the X and Y arms (Arm1 615 and Arm 2 620) may include variable optical attenuators (VOA), which may be used to change the optical intensity ratio between both arms, hence creating PDL. In most embodiments, a control device may control VOAs to create PDL. In many embodiments, a device controller may be able to control any device within a transmitter PIC. In most embodiments, a device controller may be able to control any device within a receiver PIC. In almost all embodiments, a device controller may be able use control over a PIC to introduce impairments. In some embodiments, a device controller may be able to control a splitter in a PIC, control arms in a PIC, DACs in a PIC, and electric amplifiers in a PIC. In most embodiments, a device controller may be able to insert I/Q imbalance, PDL, as well as other types of impairments by controlling one or more devices in a PIC.

Figure 7:
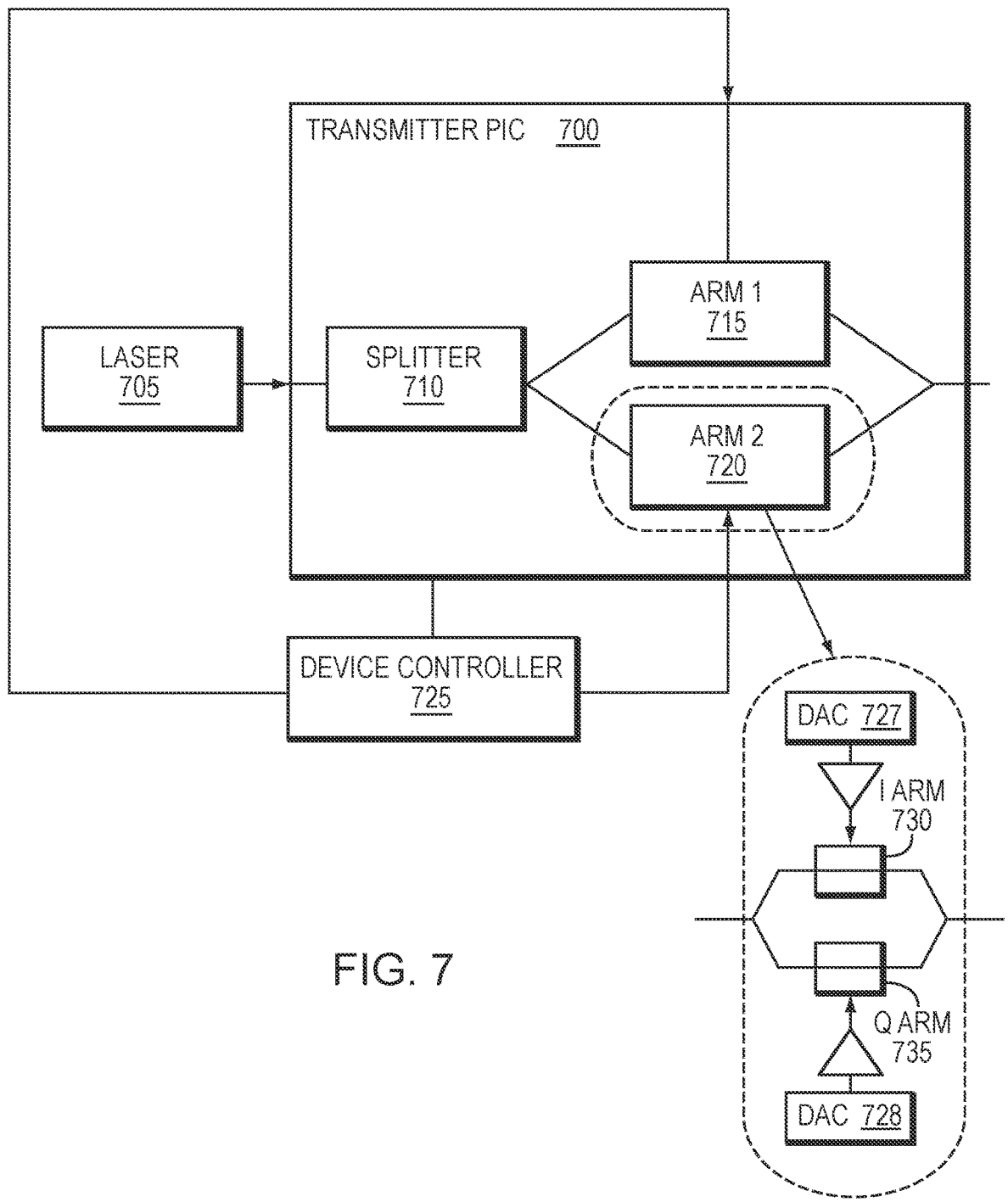
FIG. 7 is an alternative simplified illustration for generating an impairment at a modulator, in accordance with an embodiment of the present disclosure.

Refer now to the example embodiment of FIG. 7, which illustrates inserting I/Q imbalance into a system using a PIC. In modulator arm 2 720, there are two modulator arms for I and Q. The ratio of I to Q output is controlled by an I voltage and a Q voltage. If the ratio of the I voltage to the Q voltage is kept close to 1, there is little or no imbalance. If the ratio of I voltage to Q voltage is changed, then I Q imbalance is added to the system. A bias control controls the ratio between the I and Q ratio. In some embodiments the voltages of I and Q, and therefore the ratio between them, can be changed by modifying output and/or gain of electrical amplifiers, such as electric amplifiers 722 and 724 of FIG. 7, which typically feed I and Q arms, and/or by modifying output of DACs, typically feeding the electrical amplifiers. In another embodiment, IQ imbalance may be introduced by changing an intensity ratio between optical signals travelling through the I and Q arms respectively. In some embodiments, I and Q arms may include variable optical attenuators (VOA), which may be used to change the optical intensity ratio between both arms, hence creating IQ imbalance.

In some embodiments, DGD delay may correspond to delay in time between X and Y and may be created in a DSP. In some embodiments, I/Q skew may correspond to delay in time between I and Q components of each polarization and may be created in a DSP. In some embodiments a digitally delayed signal may be obtained by applying a certain finite impulse response (FIR) to the original signal. In certain embodiments, FIR filters may be applied in either the temporal or the frequency domain. In many embodiments, different filters to different signals (i.e. I and Q or X and Y) may lead to different delays between them. In some embodiments, PMD may be generated by a signal and loaded into memory of a DSP. In other embodiments, PMD may be emulated by applying different finite impulse response (FIR) to X and Y polarization signal. In another embodiment, dispersion may be added to a signal by applying a finite impulse response (FIR). In further embodiments, Polarization scrambling—optical scrambler—may be added through a block into a DSP to emulate the rotation of light polarization.

In further another embodiment, polarization rotation may be added by applying a butterfly 2×2 FIR filter matrix to X,Y signals. In some embodiments, a mathematical representation of a 2×2 Butterfly FIR Filter matrix application to a couple of X,Y signals in the time domain (note that in other embodiments this impairment may be implemented in the frequency domain) may be as follows:

$$\begin{bmatrix} s_x(n) \\ s_y(n) \end{bmatrix} = \begin{bmatrix} h_{xx}(n)^T & h_{yx}(n)^T \\ h_{xy}(n)^T & h_{yy}(n)^T \end{bmatrix} \begin{bmatrix} r_x(n) \\ r_y(n) \end{bmatrix}$$

Where $$\begin{bmatrix} r_x(n) \\ r_y(n) \end{bmatrix}$$

are the nth original samples of X and Y polarizations, $$\begin{bmatrix} s_x(n) \\ s_y(n) \end{bmatrix}$$

are the nth processed samples of X and Y polarizations and $h_{ij}$ are FIR filters, which lengths need to cover the channel impulse response that wants to be emulated (from 1 to N taps). In a particular embodiment, a simple 1-Tap 2×2 Matrix filter may emulate simple polarization rotation; and changing FIR filters over time may allow for polarization scrambling. In other embodiments, N-tap may be used to generate other time-frequency dependent impairments.

In other embodiments, a 2×2 Butterfly FIR matrix, may be used to emulate crosstalk between the different signal polarizations, and it may be extended to I-Q signals by adding 2×2 Butterfly FIR filter matrices between I and Q signals, or an N×N matrix system cross-connecting tributaries (i.e. XI, XQ, YI, YQ). In some embodiments, with N-taps, different channel responses could be may be emulated for different crosstalk elements.

In another embodiment, a FIR filter (or set of calculations) may be used to introduce a carrier frequency offset into the signal and random phase. In particular embodiments, a FIR filter may implement the following mathematical function:

$$s(n) = r(n) e^{-j(2\pi \Delta f(n) n + \theta(n))}$$

Where the signal r(n) is the original complex signal composed by I and Q tributaries, while s(n) is the resulting signal after adding a certain phase noise θ(n) and carrier frequency offset Δf(n). In some embodiments, adding capacity two parameters may two vary over time, and may emulate two of the most important impairments generated by lasers in coherent transmission optical systems.

Figure 8:
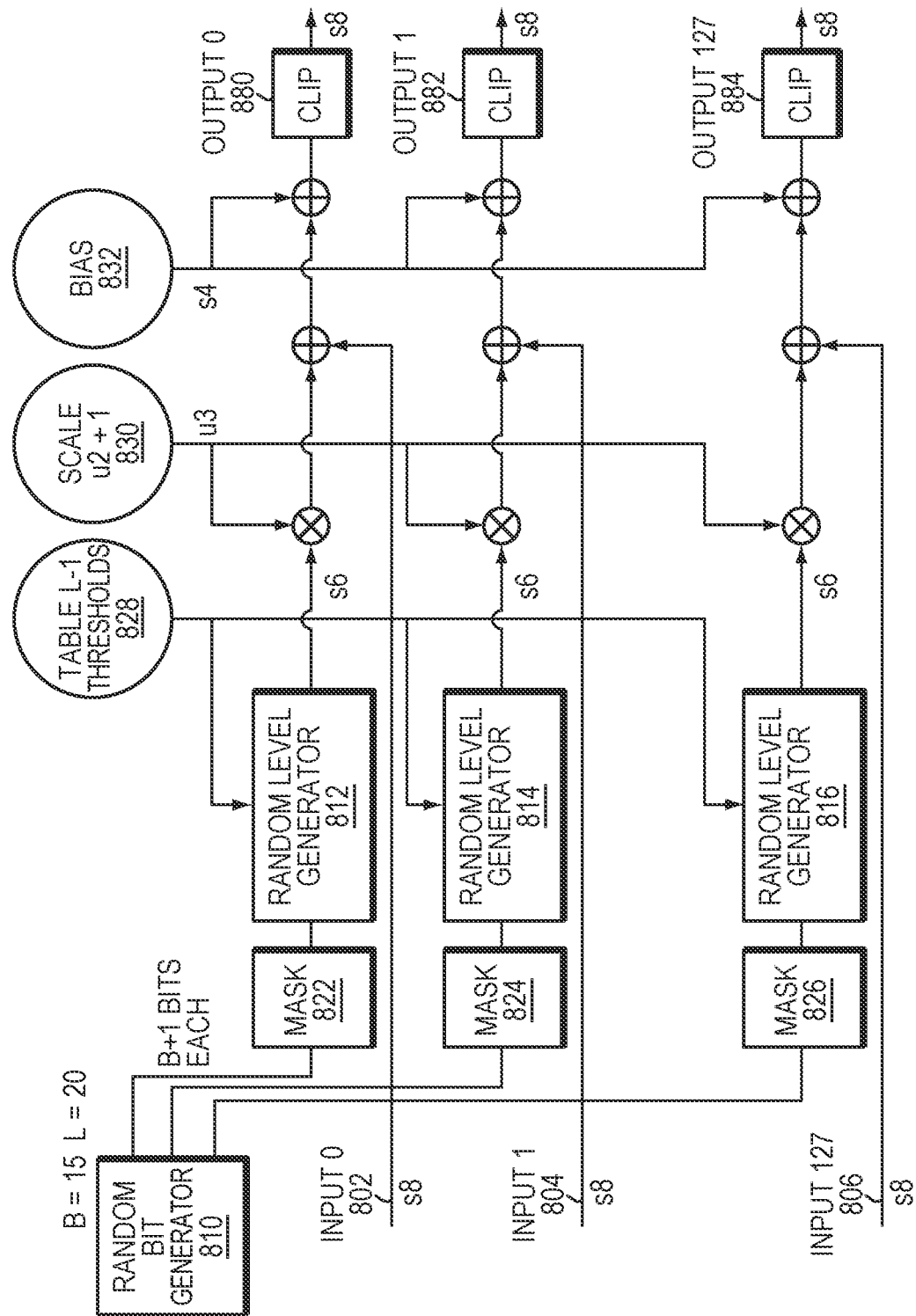
FIG. 8 is a simplified illustration of adding digital noise into a digital system, in accordance with an embodiment of the present disclosure.
Figure 9B:
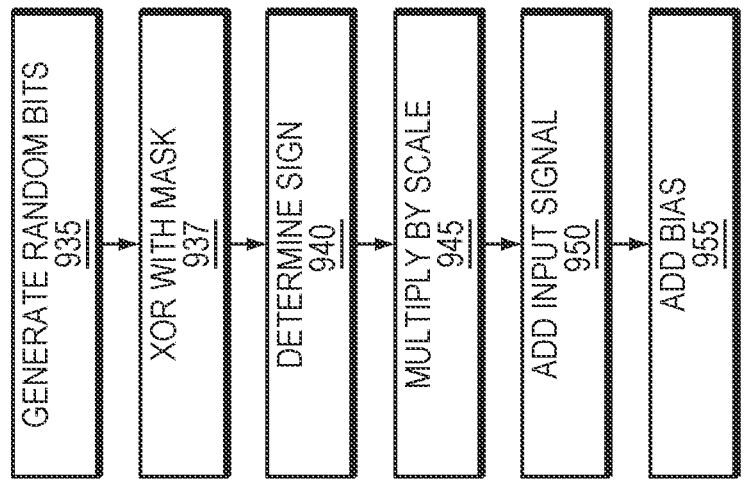
FIG. 9b is an alternative simplified method for generating optical noise, in accordance with an embodiment of the present disclosure.
Figure 9A:
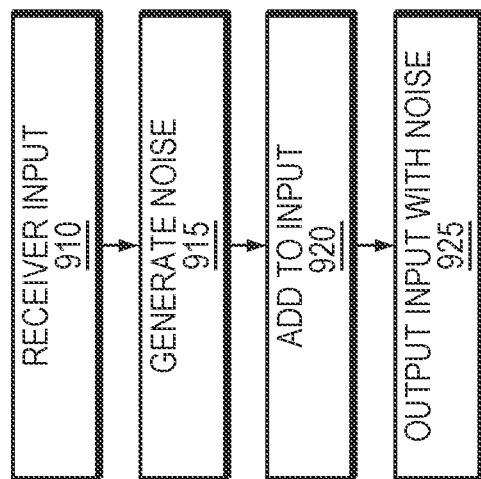
FIG. 9a is a simplified method for generating optical noise, in accordance with an embodiment of the present disclosure.

Refer now to the example embodiments of FIGS. 8 and 9a, which illustrates an apparatus and algorithm for adding simulated optical noise or ASE to an optical communication system. At each clock cycle or time increment, a number N of samples (N=128) or digital values each represented by b bit wide signed numbers (b=8 in FIG. 8) enter the system on the left FIG. 8 (step 910). Noise samples with a specified distribution are generated (step 915), added to the samples (step 920), and they are output on the right of FIG. 8 (step 925).

Referring as well to the example embodiment of FIG. 9b, the noise samples are constructed as follows:

At each clock sample or clock cycle, a linear feedback shift register (LFSR) machine, such as random bit generator 810, generates N (B+1) bits, organized as N groups of B+1 bits (step 935). The size of the LFSR register, which determines the repetition period of the LFSR machine, needs to be large enough to support the application. For example a register of 55 bits with a polynomial x^55+x^24+1 may be appropriate.

Because bits generated by a LFSR are correlated, each group of B+1 bits is xored with a B+1 bit mask (step 937). The mask, such as masks 822, 824, 826, is different for each of the N groups. For example for B=15 and B=7 the masks could be the codewords of an extended BCH error correcting code (eBCH) of length 16 with 7 information bits. In addition, a fixed pattern can also be xored with the eBCH word, to avoid having an all-0 mask.

For group N, one of the B+1 bits is used to determine the sign of a random number that will be generated (step 940). The other B bits are interpreted as an unsigned binary number m and compared the L−1 configurable thresholds $t_1$, $t_2$, . . . $t_{L-1}$, 828 where each threshold is B bit wide and they are always listed in non-decreasing order; wherein the thresholds are an array of values.

A circuit finds the largest k such that m>tk; wherein tk is the $k^{th}$ element of the thresholds $t_1, t_2, \ldots t_{L-1}$. If there is no such value for k, k is set to 0. The sign of k is changed if the bit reserved for that purpose is 1. In this embodiment, k can take integer values between −L+1 and L−1, and the probability of these values is determined by the values of the thresholds. Therefore, the threshold values can be set to approximate well-known distributions that are symmetrical around 0.

In this embodiment, the range of k is smaller than the range of the input signals, which can be between $-2^b$ and $2^{b-1}-1$. To cover the full range, k is multiplied by a configurable scale of scale u2+1 830, which is common to all N groups (step 945). The result is added to the nth input signal (step 950) and a configurable bias common (step 955), such as bias 830, to the N groups is added to the result. The output is saturated if it is outside of the signal range desired at the output.

In other embodiments, in optical applications an optical signal may have in-phase and quadrature components on both the horizontal and vertical polarizations, so typically input data may have of 4 streams. In many embodiment, multiple streams may be muxed together and handled jointly by the algorithm described in reference to the example embodiment of FIG. 8. In other embodiments with multiple data streams, an algorithm similar to that described in reference to FIG. 8 may can be executed in parallel, one for each stream. In embodiments where there are algorithms executing in parallel, it may be necessary to set initial seeds of the LFSR appropriately, to ensure that the noise patterns are shifted sufficiently with respect to each other (the shift can be made equal to about 1/(4(B+1)) of the LFSR repetition period.

In some embodiments, a device controller may be any type of controller. In certain embodiments, a microprocessor may be a device controller and run a control loop. In other embodiments, an ASIC may be a device controller and may run a control loop. In further embodiments, a device controller may be an analog circuitry. In many embodiments, a bias controller may be a device controller. In certain embodiments, a bias controller may be an analog circuitry.

In some embodiments, one or more of the embodiments described herein may be stored on a computer readable medium. In certain embodiments, a computer readable medium may be one or more memories, one or more hard drives, one or more flash drives, one or more compact disk drives, or any other type of computer readable medium. In certain embodiments, one or more of the embodiments described herein may be embodied in a computer program product that may enable a processor to execute the embodiments. In many embodiments, one or more of the embodiments described herein may be executed on at least a portion of a processor.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor DSP. In certain embodiments, one or more of the embodiments herein may be executed on a DSP. One or more of the embodiments herein may be programed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A method comprising:
   generating, by a component of a coherent optical transceiver, an impairment within the coherent optical transceiver;
   generating, by the coherent optical transceiver, a light signal from an electrical signal, the light signal having a wavelength of light encoded with coherent optical data impaired by the impairment;
   transmitting, by the coherent optical transceiver, the light signal from an output of the coherent optical transceiver to an input of the coherent optical transceiver;
   removing, by the coherent optical transceiver, the impairment in the light signal; and
   recovering, by the coherent optical transceiver, the wavelength of the light encoded with the coherent optical data.

2. The method of claim 1, further comprising:
   coupling the coherent optical transceiver to a second coherent optical transceiver to couple the light signal with the impairment;
   transmitting, by the coherent optical transceiver, the light signal with the impairment to the second coherent optical transceiver;
   removing, by the second coherent optical transceiver, the impairment; and
   decoding, by the second coherent optical transceiver, the light signal to the electrical signal.

3. The method of claim 1, further comprising:
   generating, by a digital signal process (DSP), the impairment in a digital signal; and
   creating the light signal using the digital signal.

4. The method of claim 1, further comprising:
   adjusting, by a device controller of the coherent optical transceiver, a setting of the component of the coherent optical transceiver; and
   creating the impairment based on the setting.

5. The method of claim 1, further comprising:
   generating a set of samples according to a random distribution;
   generating the impairment based on the set of samples, wherein the impairment is noise; and
   simulating an addition of noise using the samples to augment a set of values.

6. The method of claim 3, wherein the component that is adjusted comprises a plurality of electric amplifiers.

7. The method of claim 6, wherein adjusting comprises changing a signal ratio of a first electric amplifier of the plurality of electric amplifiers to a second electric amplifier of the plurality of electric amplifiers.

8. The method of claim 1, wherein the impairment is at least one of dispersion, skew, polarization skew, optical noise, In-phase/Quadrature imbalance, differential group delay, polarization mode dispersion, frequency offset or amplified spontaneous emission, polarization scrambling, polarization dependent loss, or combinations thereof.

9. An apparatus for generating an impairment for a wavelength of light in a coherent optical system, the apparatus comprising:
a coherent optical transceiver to:
generate an impairment;
generate a light signal of a wavelength of light encoded with coherent optical data impaired with the impairment;
transmit the light signal from an output of the coherent optical transceiver to an input of the coherent optical transceiver;
remove the impairment in the light signal; and
recover the wavelength of light encoded with the coherent optical data to form encoded data.

10. The apparatus of claim 9, wherein the coherent optical transceiver comprises a digital signal processor (DSP) to generate the impairment in a digital signal by changing settings of the DSP, and wherein the digital signal is used to create the light signal.

11. The apparatus of claim 9, wherein the coherent optical transceiver comprises a device controller to adjust a device of the coherent optical transceiver to create the impairment.

12. The apparatus of claim 11, wherein the coherent optical transceiver comprises electric amplifiers; wherein to adjust the device comprises adjusting the electric amplifiers.

13. The apparatus of claim 12, wherein to adjust the device comprises changing a signal ratio of a first electric amplifier of the electric amplifiers to a second electric amplifier of the electric amplifiers.

14. The apparatus of claim 9, wherein the impairment is one of at least dispersion, skew, polarization skew, optical noise, In-phase/Quadrature imbalance, differential group delay, or amplified spontaneous emission.

15. A method comprising:
generating, by a component of a coherent optical transceiver, an impairment within the coherent optical transceiver;
encoding, coherent data on a wavelength of light;
combining the wavelength of light and the impairment to form a light signal;
transmitting the light signal from an output of the coherent optical transceiver to an input of the coherent optical transceiver;
removing, by the coherent optical transceiver, the impairment in the light signal; and
decoding, by the coherent optical transceiver, the wavelength of light encoded with coherent optical data to form encoded data.

16. The method of claim 15, further comprising:
generating, by a digital signal process (DSP), the impairment in a digital signal; and
creating the light signal using the digital signal.

17. The method of claim 15, further comprising:
adjusting, by a device controller of the coherent optical transceiver, a setting of the component of the coherent optical transceiver; and
creating the impairment based on the setting.

18. The method of claim 17, wherein the coherent optical transceiver comprises electric amplifiers; wherein adjusting the component comprises adjusting the electric amplifiers.

19. The method of claim 18, wherein adjusting comprises changing a signal ratio of a first electric amplifier of the electric amplifiers to a second electric amplifier of the electric amplifiers.

20. The method of claim 15, wherein the impairment is at least one of dispersion, skew, polarization skew, optical noise, In-phase/Quadrature imbalance, differential group delay, polarization mode dispersion, frequency offset or amplified spontaneous emission, polarization scrambling, polarization dependent loss, or combinations thereof.

* * * * *